Jan. 12, 1971 — W. PAUL — 3,555,135

STRESS RELIEVING OF MOLDED PLASTIC STRUCTURES

Filed Feb. 29, 1968

INVENTOR.
WILLIAM PAUL

BY

ATTORNEYS 3,555,135
STRESS RELIEVING OF MOLDED
PLASTIC STRUCTURES
William Paul, Zephyr, Tex., assignor to Phillips Petroleum Company, a corporation of Delaware
Filed Feb. 29, 1968, Ser. No. 709,260
Int. Cl. B29c 23/00, 25/00
U.S. Cl. 264—98                                    9 Claims

ABSTRACT OF THE DISCLOSURE

Molded plastic structures comprised of two or more intersecting generally rectilinear sides or surfaces are relieved of stresses developed in the structure during the manufacture thereof by applying heat to at least one corner of said structure.

---

Figure 1:
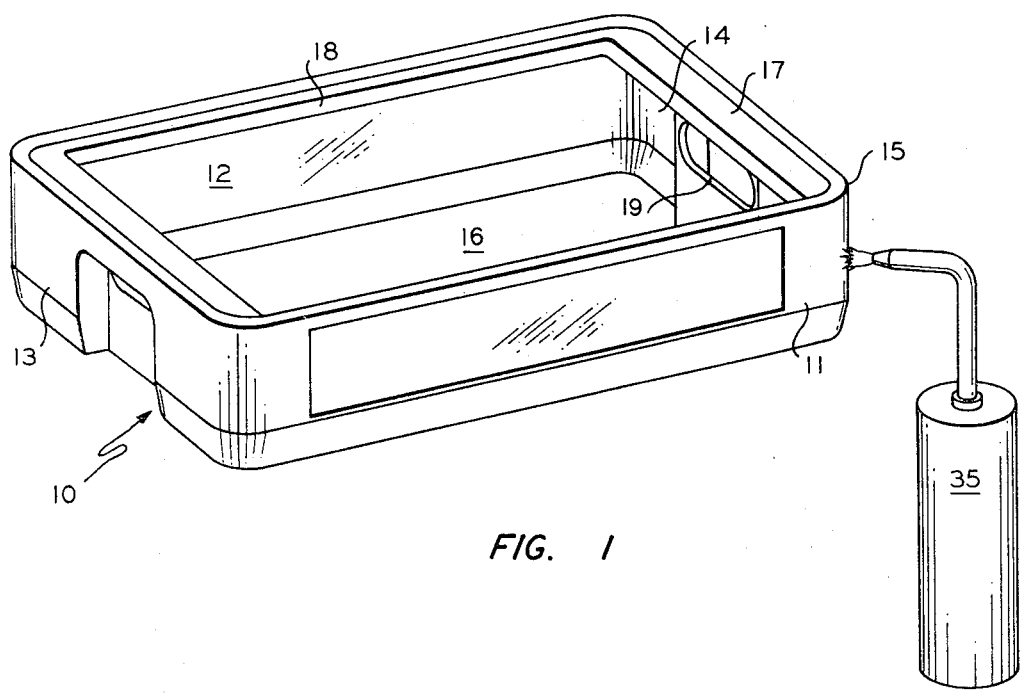

This invention relates to stress relieving of molded plastic structures. In one aspect this invention relates to a method for relieving stresses developed during the manufacture of molded plastic structures.

It is well known in the art to mold plastic materials into a wide variety of structures having various shapes. Said structures can be formed by employing processes such as blow molding, vacuum forming, and injection molding, all known in the art. Generally speaking, such processes comprises the formation of the structure from a molten plastic material in a suitable mold, the removal of the formed structure from said mold, and permitting the structure to further cool. Many variations of these processes are well known to those skilled in the art.

One difficulty frequently encountered in such processes, particularly in connection with structures comprising two or more generally rectilinear sides or surfaces, is that after removal of the structure from the mold in apparently perfect shape one or more sides or surfaces, upon cooling to ambient temperature or temperatures approaching ambient temperature, will become bowed, or warped, e.g., curved. Much time and money has been expended in efforts to solve this problem. Molding techniques have been studied in detail and many variations thereof developed. Heat treating of the entire structure has also been employed. However, in many instances, these efforts have been unsuccessful and none has been successful to the extent that it could be considered a real solution to the problem.

The present invention provides a solution to said problem. I have discovered that bowing, warping, or curving, of the sides or surfaces of molded plastic structures is due to stresses which have developed during the manufacture of the structure, e.g., during the molding and/or cooling. I have further discovered that said stresses can be relieved by applying heat to only a corner or corners of the structure. This was indeed surprising and unexpected, particularly in view of the fact that oven heating of the entire structure to stress relieve same has, in general, been unsuccessful.

Thus, broadly speaking, the present invention resides in a method of stress relieving molded plastic structures which comprises applying heat to a corner or corners of said structure.

An object of this invention is to provide an improved method of manufacturing molded structures from plastic materials. Another object of this invention is to provide a method for stress relieving structures molded from plastic materials. Another object of this invention is to provide a method for stress relieving generally rectilinear-shaped structures molded from plastic materials by applying heat to a corner or corners only of said structure. Other aspects, objects, and advantages of the invention will be apparent to those skilled in the art in view of this disclosure.

Thus, according to the invention, there is provided a method of relieving stresses developed during the manufacture of a substantially rectilinear-shaped structure molded from a thermoplastic polymer, said structure comprising a plurality of sides joined at adjacent edges thereof to form at least one corner, which method comprises, applying heat to said corner of said structure in an amount and for a period of time sufficient to relieve said stresses but insufficient to cause melting of said polymer.

The invention is broadly applicable to a wide variety of plastic materials which are capable of being molded into various desired structural shapes. The invention is particularly applicable to structural shapes molded from thermoplastic polymer materials such as cellulose acetate, cellulose acetobutyrate, polystyrene, polymers of 1-olefins, and the like. Preferably, said thermoplastic material is a crystalline material. The preferred plastic polymer materials suitable for use in the practice of the invention are the normally solid polymers of aliphatic 1-olefins containing from 2 to 8 carbon atoms per molecule; said polymer having a density in the range of 0.94 to 0.98, preferably 0.949 to 0.97, gram per cubic centimeter, and a molecular weight in the range of about 35,000 to about 250,000. As employed herein and in the claims, unless otherwise specified, the term "polymer" includes homopolymers of said 1-olefins, copolymers of one of said 1-olefins with another of said 1-olefins as a comonomer, and blends of at least one of said polymers or copolymers with normally solid polyisobutylene. The 1-olefins having from 2 to 4 carbon atoms per molecule are usually more preferred for preparing the plastic polymer materials employed in the practice of the invention. For example, polyethylene, polyproylene, copolymers of ethylene and propylene, copolymers of ethylene and 1-butene, and the like. However, any normally solid polymer of a 1-olefin having suitable properties as set forth herein can be used in the practice of the invention. Methods for preparing said normally solid polymers of said 1-olefins are well known to those skilled in the art. A preferred method for preparing said normally solid polymers of 1-olefins is that described and claimed in U.S. Pat. 2,825,721, issued Mar. 4, 1958, to J. P. Hogan et al. Polymers prepared in accordance with the method of said patent are known as linear polymers and are available commercially under the trademark Marlex.

It will be noted that only a corner or corners of the structure are heated. As used herein and in the claims, unless otherwise stated, the terms "corner" or "corner region" refers to the region immediately adjacent the intersection of two or more sides or surfaces comprising the structure. Said intersection can be an angular intersection to provide an angular corner or can be a curved intersection to provide a curved or rounded corner.

The amount of heat applied to the corner or corners of the structure to be heated is not critical so long as it is sufficient to relieve the stresses formed during the manufacture of the structure but is insufficient to cause melting of the material from which the structure has been molded. The length of time heat is applied to said corner or corners will vary with the intensity of the heat and also is not critical so long as said heat is applied for a period of time which is sufficient to relieve said stresses but which is insufficient to cause melting of the material from which the structure is molded. Thus, in the practice of the invention, heat is applied to a corner or corners of the molded plastic structure in an amount and for a period of time sufficient to relieve the stresses developed therein during the manufacture of the structure but insufficient to cause melting of the polymer from which the structure is molded. Generally speaking, and as a further guide to those skilled in the art, heat can be applied to said corner or corners of the structure in an amount and for a perod of time sufficient to increase the temperature of the corner region(s) of said structure to a temperature within the range of from 1 to about 50° F. below the crystalline freeze point of the material from which the structure is molded.

Crystalline freeze points are determined by melting a sample of the polymer, inserting a thermocouple into the molten polymer, and allowing the molten polymer to cool slowly. The temperature is recorded during said cooling and plotted versus time. The crystalline freeze point is the first plateau in the time versus temperature curve. Crystalline freeze points of the above-described preferred polymers are usually in the range of from 200 to 400° F.

In the practice of the invention, heat can be applied to the structure corner or corners to be heated either individually or simultaneously, i.e., one at a time or all at one time. It is usually prefered to apply heat simultaneously to all the corners of the structure which are to be heated, when more than one corner is heated. When applying heat to a corner or corners of a structure, for example a horizontally disposed structure such as illustrated in FIG. 1, said heat is usually applied over substantially all the longitudinal or vertical extent of the corner. In the normal practice of the invention, heat will be applied only a relatively small distance, measured laterally or horizontally, on either side of the corner. This lateral distance is not critical and will vary with the size of the structure, as will be understood by those skilled in the art in view of this disclosure. Usually, said lateral distance will be within the range of about 1 to about 15, preferably about 2 to about 8 percent of the horizontal length of the intersecting sides or surfaces forming said corner. Thus, in the practice of the invention heat is applied to a structure corner over substantially all the longitudinal extent of said corner and for a relatively small lateral distance on either side of said corner.

The invention is applicable to a wide variety of structures comprised of two or more intersection substantially rectilinear sides or surfaces. For example, the invention is applicable to V-shaped structures comprised of two intersecting sides or surfaces, generally rectangular-shaped structures comprised of four intersecting sides or surfaces, and polygonal-shaped structures comprised of more than four intersecting sides or surfaces.

Figure 2:
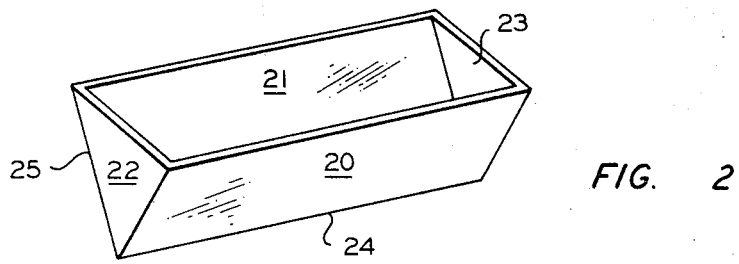
Figure 3:
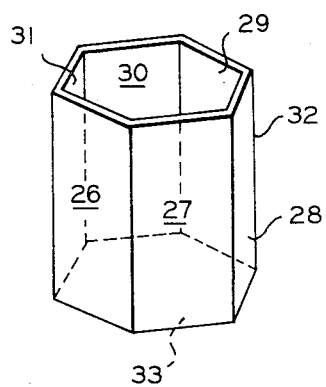

FIGS. 1, 2 and 3 are perspective views of different types of structures which can be stress relieved in accordance with the method of the invention.

Referring now to the drawings, the invention will be more fully explained. In FIG. 1, there is illustrated an open-topped carrying case or container suitable for carrying packs of bottles or other articles. Said container comprises an outer case or shell 10 formed of side walls or surfaces 11 and 12, and end walls or surfaces 13 and 14. Said side walls 11 and 12 intersect said end walls 13 and 14 adjacent ends or edges thereof to form four corners 15. It will be noted that said corners are curved or rounded for additional strength. If desired, said corners could be angular. Said container is also provided with a bottom panel or surface 16 which intersects said side and end walls at the lower extremities thereof. Said container is also provided with a top surface or rim 17 extending around the surface therof. Depending downwardly from rim 17 is a lip or flange 18 which serves to stiffen the upper surface as well as the entire hollow shell structure of the container.

Shell 10 can be formed as a unitary structure by blow molding or vacuum molding techniques. In the blow molding operation, a tube or parison of a suitable plastic material, such as rigid polyethylene, is extruded downwardly. A pair of mold sections is positioned below the extruder and is separated to allow the parison to descend into the open space between the mold sections. When a sufficient length of the molten parison has been extruded, the mold sections are brought together and air under pressure is admitted to the interior of the molten parison. The air inflates the parison to conform to the inner surface of the mold to convert the parison to a hollow closed shell of substantially uniform wall thickness. Upon contacting the inner surfaces of the mold, the molten thermoplastic is rapidly cooled and assumes its final configuration. The mold may be shaped so that the outer edges meet at a sharp junction to sever any surplus portion of the parison above or below the mold from the completed shell.

A shell formed according to the foregoing process will be substantially closed and can be further processed to make the carrier illustrated by removing the large depressed area extending across the top of the shell which area joins depending lip or flange 18. Also to be removed, if desired, are hand holes 19 at each end of the carrier. Further details regarding the manufacture of the carrier illustrated in FIG. 1 can be found in Pat. 3,327,-885, issued June 27, 1967, to R. A. Carle et al.

Referring now to FIG. 2, there is illustrated a generally V-shaped, open-topped container comprised of elongated sides or surfaces 20 and 21 which intersect each other at their lower edges to form an angular corner 24. V-shaped end panels 22 and 23 are positioned between said sides 20 and 21 and are joined thereto during the molding of the structure to form angular corners 25. If desired, the structure illustrated in FIG. 2 can be formed without said end panels 22 and 23 to provide an open-topped, V-shaped conduit having the one angular corner 25. Such a conduit would be useful for house gutters, etc.

Referring now to FIG. 3, there is illustrated a generally hexagonal-shaped, open-topped container comprised of sides or surfaces 26, 27, 28, 29, 30, and 31 which intersect at adjacent edges thereof to form a plurality of angular corners 32. Said container is also provided with a bottom panel 33 which intersects said side walls at the lower extremities thereof.

As indicated herein, one or more corners only of the structure are heated in the practice of the invention. The corner or corners which are heated will be one or more of the corners which define or form at least a portion of the boundary of the warped side or surface of the structure. The actual specific corners selected will depend upon the particular structure which is to be stress relieved, the particular molding operation or technique and conditions therein employed in molding said structure, the plastic said structure is molded from, and other factors. It is not always necessary to heat all the corners defining or forming a portion of the warped side or surface. In some structures it will be necessary to heat only one corner, depending upon where the stress is located. In other structures it will be necessary to heat more than one corner, e.g., the corners at the ends of the wraped side(s) or surface(s). For example, referring to FIG. 1, and Example II hereinafter, in the particular container there illustrated and described it was desirable to heat the vertical corners 15 which define the ends of side panels 11 and 12. It was not necessary to heat the corners formed at the intersections of said side panels with bottom panel 16.

The following examples will serve to further illustrate the invention.

EXAMPLE I

Open-topped containers or carrying cases essentially like the container illustrated in FIG. 1 were manufactured from a high density polyethylene having a density of about 0.960 in a blow molding operation substantially as described above in connection with FIG. 1. The cycle time in said operation was approximately 2 minutes, i.e., a container was ejected from the mold approximately every 2 minutes. Upon ejection the containers were permitted to cool at ambient temperature for about 4 hours before the depressed area joining depending lip or flange 18 was routed out. At the end of approximately 24 hours it was found that in the majority of containers the sides 11 and 12 thereof were bowed or curved inwardly from the specification inside dimension of 11.094 inches for a distance of approximately ¼ to approximately ⅜ inch.

An attempt was made on a large number of said bowed or warped containers to remove the bow in the sides thereof by passing the containers on a conveyor belt through a hot air oven. In said oven the containers were subjected to temperatures as high as about 240° F. for periods of time up to about 6 or 8 minutes. This operation was not considered successful because the majority of the containers or cases so heat treated retained the bowed or warped condition upon cooling down to ambient temperatures.

EXAMPLE II

Open-topped containers were manufactured in the same manner as described in Example I, except that the oven heat treatment there described was omitted. Said containers were stress relieved in accordance with this invention by heating all four vertical corners 15 simultaneously with a flame for approximately 15 seconds. Said flame was obtained by burning a normally gaseous hydrocarbon. The corners 15 of the cases were treated with flame over essentially the entire vertical distance thereof and over a lateral distance on each side of the corner up to about one inch. After the flame treatment the containers were permitted to cool to ambient temperature. Upon measuring the containers after cooling, it was found that the bowed or warped condition had been removed from the container walls and the containers had returned to specification inside dimension of 11.094 inches.

The thus stress relieved containers were subjected to immersion in hot water at 190° F. for approximately 10 minutes. In working with containers of this type it has been found that this test will cause any latent stress to exert itself. All of the containers which had been stress relieved in accordance with the invention passed the said hot water treating test an dretained specification inside dimensions.

EXAMPLE III

Repeated test runs were carried out essentially as described in Example II above. In some of these test runs all four corners 15 of the containers were heated by simultaneous application of flame. In other test runs individual corners 15 of other containers were treated individually. All of said test runs were successful, showing that either simultaneous of individual heat treatment of the corners can be employed in the practice of the invention.

EXAMPLE IV

In another series of test runs open-topped containers manufactured in the same manner as described in Example I, except that the oven heat treatment there described was omitted were employed. In these test runs it was found that application of heat from a flame directly to the central portion of the inwardly bowed side walls 11 and 12 for approximately 15 to 20 seconds, substantially in the same manner as applied to the corners 15 in Example II, was not successful in relieving the stresses in the containers and causing said side walls thereof to straighten.

The above example demonstrate conclusively that molded plastic structures can be stress relieved in accordance with this invention by application of heat to a corner or corners only of said structures.

While the invention has been described with particular refernce to using a flame obtained by the combustion of a combustible hydrocarbon such as natural gas or liquefied petroleum gas as the source of heat, as from torch 35 in FIG. 1, the invention is not so limited. When it is desired to simultaneously heat treat a plurality of corners, suitable apparatus for holding a plurality of torches or burners can be readily devised by those skilled in the art in view of the disclosure. The necessary heat used in the practice of the invention can be obtained from any convenient source such as steam, super-heated steam, radiation as from heat lamps, etc. The only requirement in accordance with the invention is that the heat be applied only to a corner or corners of the structure.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:

1. In a method for the molding of a substantially rectilinear-shaped structure from a thermoplastic polymer, said structure comprising a plurality of sides joined at adjacent edges thereof to form at least one corner, wherein said structure after being removed from the mold becomes bowed or warped due to stresses developed therein, and wherein said structure is normally stress relieved by heating the entire structure, the improvement which comprises: stress relieving said structure by applying heat to said corner only of said structure in an amount and for a period of time sufficient to relieve said stresses but insufficient to cause melting of said polymer.

2. A method according to claim 1 wherein heat is applied to said corner in an amount and for a period of time sufficient to increase the temperature of the corner region of said structure to a temperature within the range of from 1 to 50° F. below the crystalline freeze point of said polymer.

3. A method according to claim 1 wherein said structure has a plurality of corners, more than one of said corners is heated, and heat is applied to all of said heated corners simultaneously.

4. A method according to claim 1 wherein said structure has a plurality of corners, more than one of said corners is heated, and heat is applied to each of said heated corners individually.

5. A method according to claim 1 wherein: said structure comprises a generally rectangular open-top carrying case formed by blow molding from a thermoplastic polymer; said case has four generally vertically extending corners; and heat is applied to each of said four corners.

6. A method according to claim 1 wherein: said structure is formed by blow molding from a thermoplastic polymer at a temperature above its crystalline freeze point, said thus formed structure is cooled to substantially ambient temperature, and heat is applied to at least one corner region of said cooled structure in an amount and for a period of time sufficient to increase the temperature of said corner region to a temperature within the range of from 1 to 50° F. below said crystalline freeze point of said polymer.

7. A method according to claim 6 wherein said structure comprises a generally rectangular open-top carrying case blow molded from a normally solid polymer of an aliphatic 1-olefin containing from 2 to 8 carbon atoms per molecule, said polymer having a density within the range of from about 0.94 to about 0.98.

8. A method according to claim 7 wherein said polymer is a polyethylene having a density within the range of about 0.94 to about 0.96.

9. A method according to claim 1 wherein: said structure has a plurality of sides joined at adjacent edges thereof to form a plurality of corners; and heat is applied to at least one of said corners.

References Cited
UNITED STATES PATENTS

| | | | |
|---|---|---|---|
| 2,375,827 | 5/1945 | Slaughter | 264—177 |
| 3,293,341 | 12/1966 | Bolke et al. | 264—346 |

OTHER REFERENCES
Modern Plastics, Modern Plastics Inc., New York, N.Y., page 89, August 1950.

ROBERT F. WHITE, Primary Examiner

G. AUVILLE, Assistant Examiner

U.S. Cl. X.R.

264—230, 235, 346